INVENTOR
HARRY M. COURTER
BY S. C. Yeaton
ATTORNEY

Nov. 1, 1966 H. M. COURTER 3,283,317

SYMBOL GENERATORS

Filed June 14, 1963

4 Sheets-Sheet 2

INVENTOR.
HARRY M. COURTER
BY
S. C. Yeaton
ATTORNEY

INVENTOR.
HARRY M. COURTER
BY S. C. Yeaton
ATTORNEY

Nov. 1, 1966

H. M. COURTER 3,283,317

SYMBOL GENERATORS

Filed June 14, 1963

4 Sheets-Sheet 4

INVENTOR.
HARRY M. COURTER
BY
S. C. Yeaton
ATTORNEY

United States Patent Office 3,283,317
Patented Nov. 1, 1966

3,283,317

SYMBOL GENERATORS

Harry M. Courter, East Norwich, N.Y., assignor to Sperry Rand Corporation, Great Neck, N.Y., a corporation of Delaware Filed June 14, 1963, Ser. No. 287,929
13 Claims. (Cl. 340—324)

This invention relates to visual display systems and more particularly to circuits for generating voltages that are suitable to form characters and symbols on cathode ray tubes.

Information is frequently read out of an electronic computer by converting the output of the device into voltages that are capable of forming symbols such as alphabetical or numerical characters on a cathode ray tube.

Several clases of devices exist for forming such symbols on the face of a cathode ray tube.

One of the more practical of these classes involves the use of waveform generators that provide varying signal voltages for deflecting the beam of the cathode ray tube so as to trace the desired symbol on the face of the tube. In these "stroke" methods, the beam acts much like a pencil to trace the desired symbol on the face of the tube.

In one variety of this class of device, complex waveforms are applied to the input terminals of the tube. Beam blanking is employed to cut off the beam as it sweeps over portions of the tube face where a gap is to appear in the luminous symbol.

The electrical circuits for generating the complex waveforms in these devices are difficult to design, adjust, and maintain. Each symbol to be generated requires an individual circuit. The blanking must be precisely timed in order to provide clear-cut symbols.

A variant of this scheme utilizes special optical masks in conjunction with photoelectric cells to generate complex waveforms. The complex optical system required in this device is cumbersome, expensive, and requires precise adjustment.

Another variety of devices using the "stroke" method involves the use of special cathode ray tubes in which stencil masks in the electron beam path extrude the beam into the desired shape. These cathode ray tubes, however, are necessarily complex and expensive.

It is an object of the present invention to provide means that utilizes only simple wave shapes for generating symbols on a cathode ray tube.

It is another object of the present invention to provide a symbol generating means that requires a minimum of parts.

Another object of the invention is to provide a symbol generating means that does not require critical beam blanking.

Still another object of the invention is to provide symbol generating networks that rely almost entirely on passive circuit elements.

Yet another object of the present invention is to provide relatively compact and inexpensive means for generating symbols for display on a cathode ray tube.

These and other objects are achieved by considering the individual symbols as being composed of a combination of segments common to a plurality of symbols, providing electrical networks for generating voltages capable of producing the individual segments on a cathode ray tube, and sequentially switching the output of appropriate networks to a cathode ray tube so as to synthesize a desired symbol.

The principle of the invention can be understood by referring to the following description and the accompanying drawings.

Figure 1:
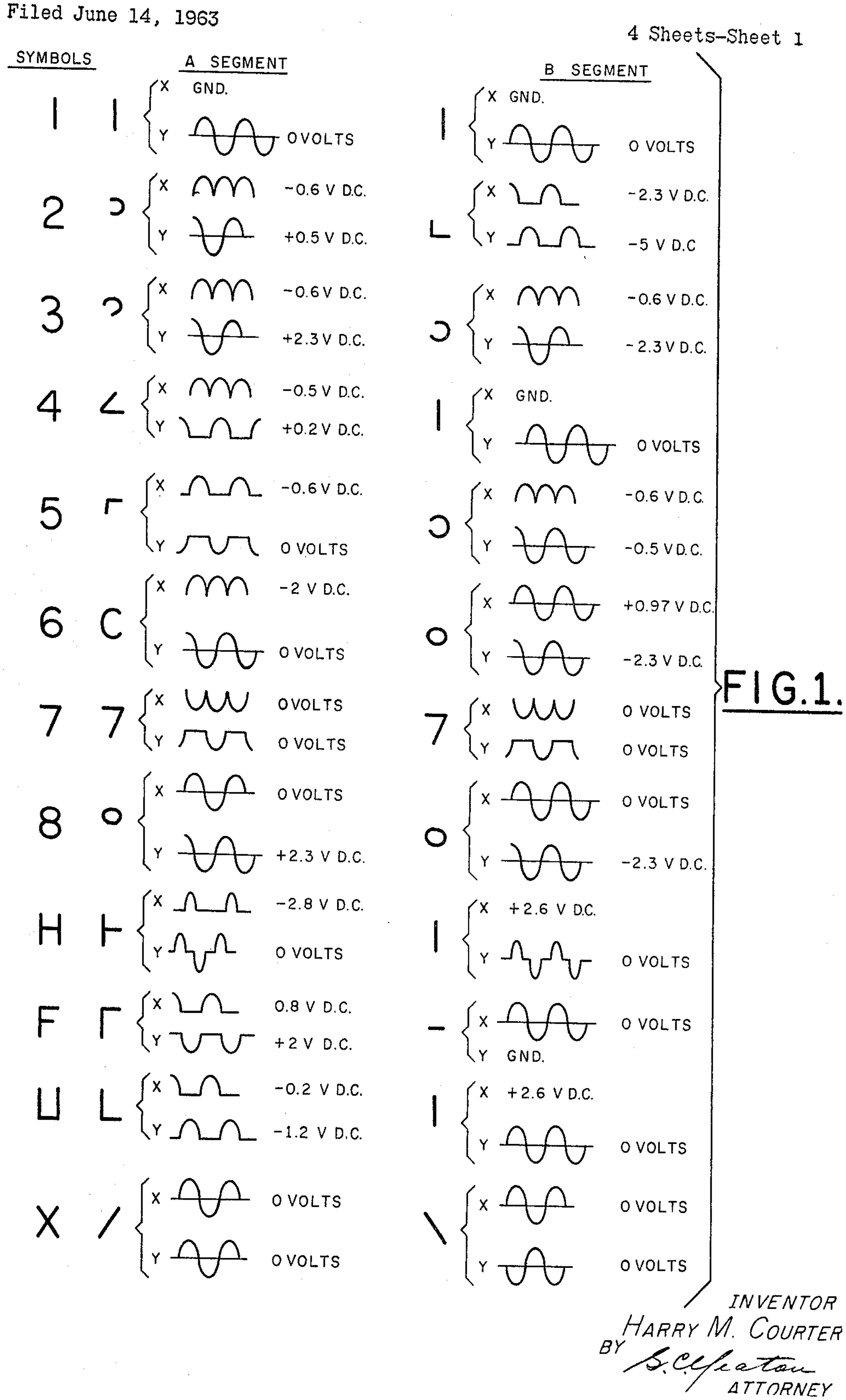
FIG. 1 is a diagram that is useful in understanding the invention.

FIG. 1 indicates how a variety of symbols may be generated according to the invention. The numeral "1" may be formed by applying a steady bias to the X (horizontal) deflection plates of a cathode ray tube while applying a sine wave to the Y deflection plates of the tube as indicated in the figure.

More complicated symbols may be formed by generating a pair of relatively simple segments and then combining these segments to synthesize the desired symbol. Thus, a "2" may be synthesized by combining a semi-elliptical segment and an "L" shaped segment. A "3" may be synthesized by combining a first and second semi-elliptical segment, and so on.

In practice, the voltage waveforms for forming the individual segments are applied sequentially to a cathode ray tube. The segments are positioned on the tube face by applying suitable biasing voltages. Typical values of these biasing voltages are indicated in FIG. 1.

The various waveforms are applied to the X (horizontal) or the Y (vertical) deflection plates as indicated. The waveforms consist entirely of sine waves and rectified or clipped sine waves. The segment generating networks used to convert sine waves into the desired waveform may be built from simple circuit elements, since the networks function only to eliminate predetermined portions of the incident sine wave and to couple the remaining portions to the cathode ray tube.

Figure 2:
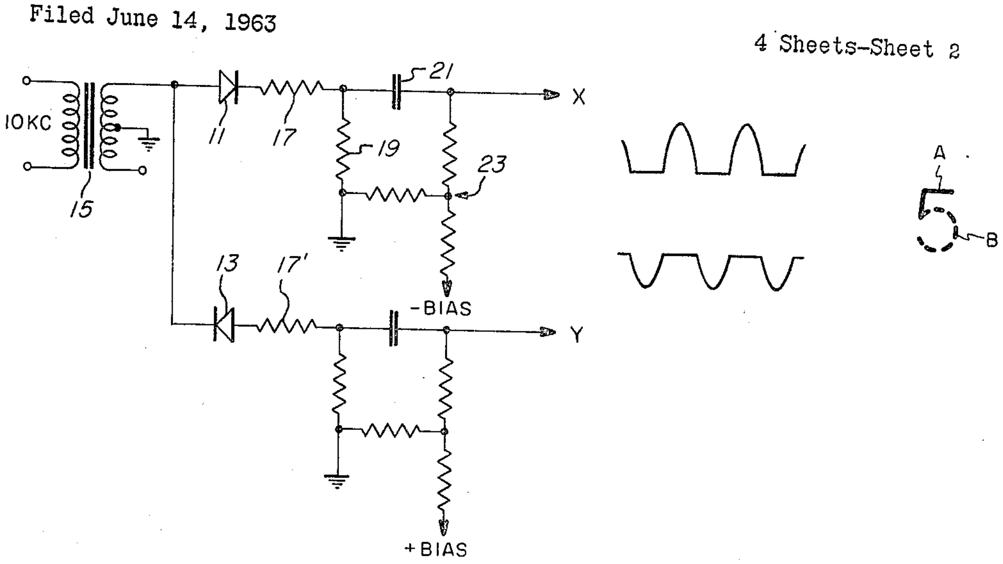
FIG. 2 is a circuit diagram of a segment generating network for forming the angulate segment of a "5."

FIG. 2 is a circuit diagram, given by way of example, to illustrate the relative simplicity of a typical symbol generating network that has been used in practicing the present invention. This particular network was used for generating the waveform corresponding to the angulate (A) segment of the numeral "5." The network is composed entirely of passive elements.

A pair of diodes 11 and 13 are connected to one output terminal of the transformer 15 so as to conduct on opposite halves of the cycle. The resistors 17 and 19 form a voltage divider and are selected to provide an output voltage having a suitable amplitude. The D.C. blocking capacitor 21 allows the output to be established at a negative bias determined by the magnitude of the bias voltage and the voltage divider network 23. The negative half-wave rectified sine wave from the diode 13 is applied to a similar network having appropriate resistance values. The amplitude of the X signal is normally adjusted to about twice that of the Y signal in order to obtain a well porportioned segment.

In operation, a request for the symbol "5" causes the network of FIG. 2 to be coupled to the cathode ray tube. The D.C. bias originally deflects the electron beam upward and to the left of its quiescent position to the vertex of the A segment. The Y voltage falls and then rises through a half cycle of the sine wave while the X voltage remains at a constant level. This produces the vertical line of the A segment. The beam is then deflected to the right and back again by the X voltage excursion, producing the horizontal line of the A segment. This network is then disconnected from the tube and the symbol generating network producing a semi-ellipse is substituted so as to produce the B segment. The persistence of the tube phosphor is sufficient to produce the illusion of a unitary symbol.

It will be appreciated that the basic network of FIG. 2 can be used to produce segments for a variety of symbols. By taking a suitable tap off the resistor 17', for instance, the proportions of the angulate A segment can be rearranged to provide a full length vertical line suitable for forming one segment of the capital letter "F."

Voltages for forming segments of still other symbols can be derived from the same basic network. In this way, many circumstances arise in which one network can be used as a common segment generating network for several symbols so as to effect an economy in size, weight, and expense.

Because of this feautre, it is necessary to provide only networks generating straight lines, angulate lines, ellipses, semi-ellipses, D's, and branched lines to form an entire alphabet of capital letters, a set of numerals, and a variety of geometrical symbols.

Straight line segments, of course, can be generated by applying a sine wave to one pair of deflection plates while biasing the other set. Slanted lines can be obtained by applying either in-phase or out-of-phase sine waves to both sets of plates, whereas ellipses may be obtained by merely adjusting the phase relationship between the two sine waves of this network.

90° angulate segments such as those formed by means of the network of FIG. 2 may be produced in various orientations by merely reversing the polarity of the appropriate wave train and adjusting the bias so that the vertical and horizontal lines intersect at the desired position.

Figure 3:
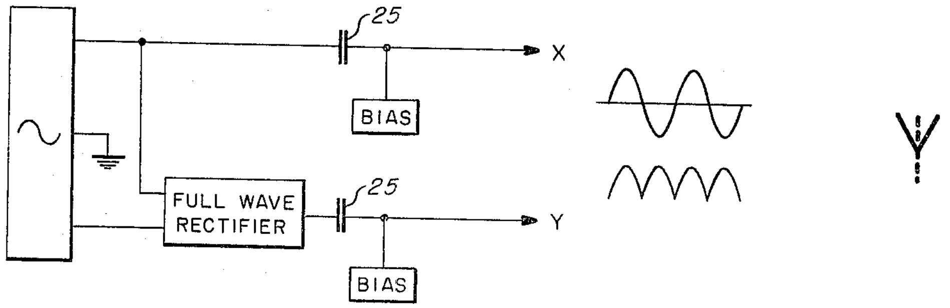
FIG. 3 is a block diagram of a network for providing angulate segments having symmetry about a vertical axis.

Angulate segments having sides that are symmetrical about the vertical axis may be produced with the network shown in FIG. 3. The D.C. blocking capacitors 25 permit the bias voltages to be used for adjusting the position of the electron beam so that the vertex of the segment is at the proper position on the face of the cathode ray tube. The magnitude of the included angle may be adjusted by varying the relative amplitudes of the X and Y waveforms. The segment may be rotated 90° clockwise by interchanging the X and Y terminals or it may be inverted by reversing the polarity of the rectified wave.

Figure 4:
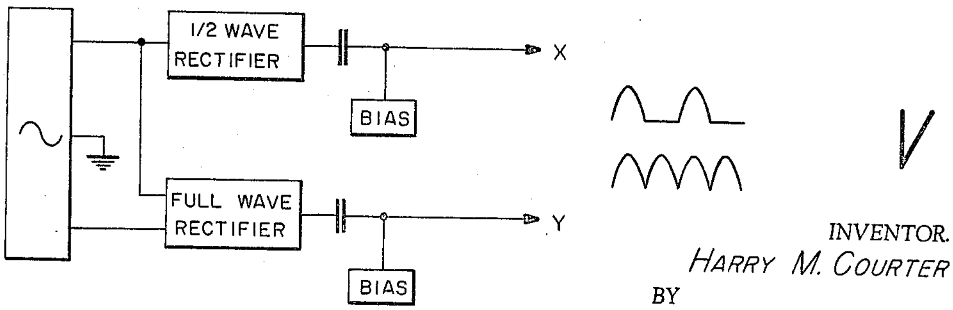
FIG. 4 is a block diagram of a network for providing angulate lines having one side along an axis.

By inserting a half-wave rectifier in the X line, as shown in FIG. 4, an angulate segment having one vertical side may be obtained. This segment may be rotated clockwise by interchanging the X and Y terminals or inverted by reversing the polarity of the full-wave rectified signal.

Figure 5:
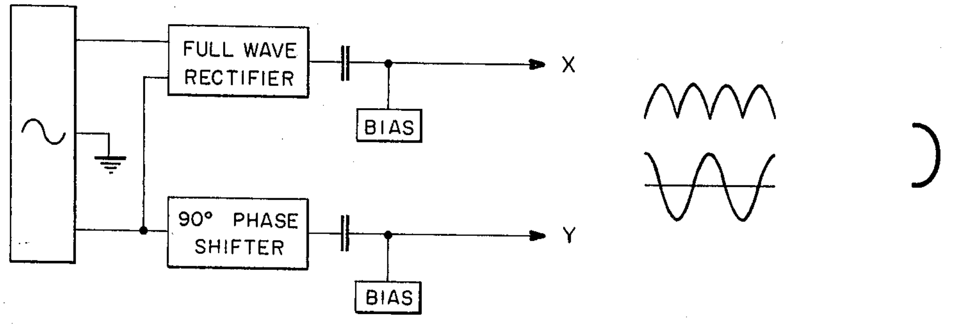
FIG. 5 is a block diagram of a network for providing a semi-ellipse.

A semi-ellipse may be generated by using the network of FIG. 5. Here again, the segment may be rotated by interchanging the X and Y terminals, or reversed by reversing the polarity of the rectified wave.

Figure 6:
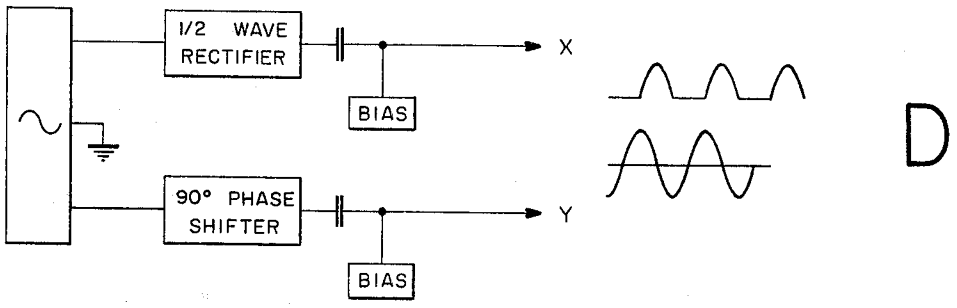
FIG. 6 is a block diagram of a network for providing a "D."

A "D" may be generated by using the network of FIG. 6. This segment may also be rotated or reversed by using the techniques previously described.

Figure 7:
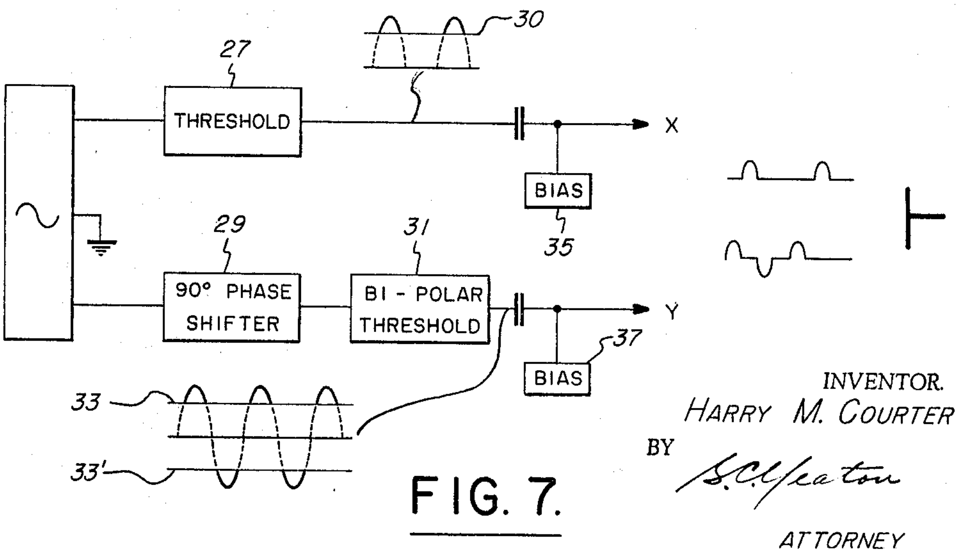
FIG. 7 is a block diagram of a network for providing a branched line.

FIG. 7 is a block diagram of a network that may be used for producing a branched line segment. This particular segment is primarily used in the symbol "H," however other symbols may be formed from this segment if desired.

A threshold circuit 27 is placed in the X terminal line whereas a 90° phase shifter 29 and a bi-polar threshold circuit 31 are inserted in the Y terminal line.

The threshold circuit 27 passes only portions of the sine wave exceeding a predetermined positive threshold value 30. Such circuits are well known and preferably contain a back-biased series diode as a switching element. The threshold level above which the circuit conducts is determined by the magnitude of the back-bias employed. The bi-polar threshold circuit 31 preferably contains two back-biased diodes arranged to conduct on opposite halves of the cycle so that both the positive and negative peaks exceeding the threshold values 33 and 33' will be passed. Blocking capacitors serve to remove the D.C. component from each wave so that the resulting waves supplied to the X and Y network terminals consist of spaced peaks of sine waves arising from the level of the D.C. bias.

The 90° phase shifter 29 is inserted in the Y terminal line so that the pulses at this terminal will occur in the intervals between pulses on the X terminal. The threshold levels are preferably selected so that any given pulse begins only after the preceding pulse is complete. For sine wave of equal amplitude, the threshold levels can thus be set to provide conduction periods corresponding to angles of 90° of the impressed sine wave.

In operation, the beam of cathode rays is first deflected upward and then back again to the quiescent point, outward and back to the quiescent point, and finally downward and back to the quiescent point during each cycle. As was the case with the other networks the segment can be rotated or reversed if desired.

Figure 8:
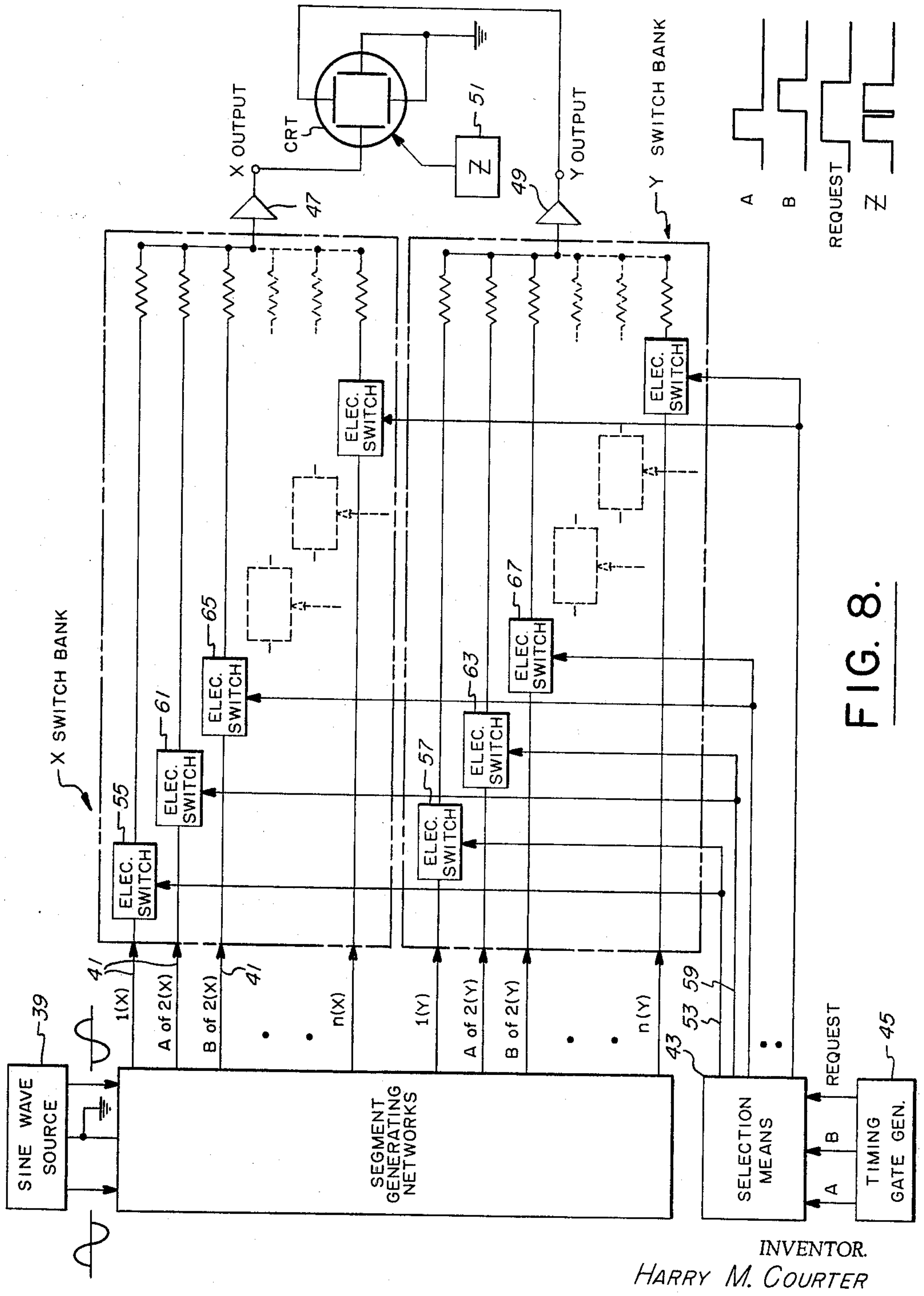
FIG. 8 is a block diagram of a symbol generator constructed according to the principles of the invention.

FIG. 8 is a block diagram of a symbol generator constructed according to the principles of the invention. A common sine wave source 39 provides two out-of-phase sine waves to energize the various segment generating networks. The frequency of the sine waves is conveniently set at 10 kc. although this frequency is not critical. The segment generating networks are energized constantly during the operation of the device. The outputs from these networks are coupled to X and Y switch banks through individual leads 41. Thus if a symbol "2" is to be formed by providing a semi-ellipse during the A segment interval and a 90° angulate line during the B segment interval, the lead A of 2(X) would be connected to the X network terminal of the network shown in FIG. 5, and the lead A of 2(Y) would be connected to the Y network terminal of the same network. Similarly, the B of 2(X) and the B of 2(Y) leads would be connected to the X and Y network terminals respectively of the network for producing the proper angulate segment.

Each of the leads 41 is connected to an individual normally open electronic switch. These switches are operated from a selection means 43 in response to pulses from a timing gate generator 45. The signals passed through the X and Y switch banks are fed through the summing amplifiers 47 and 49 to the X and Y output terminals respectively.

The electronic switches preferably take the form of conventional inhibiting gates, although relays or other kinds of switches could be employed if desired.

Similarly, any suitable type of switches may be used in the selection means. Manual switches could be used if desired. In a practical embodiment of the invention, a matrix of solid state swtiching elements is used to respond to the output of an associated computer. In this embodiment, the timing gate generator 45 produces alternate A segment and B segment timing pulses and a request pulse whenever a symbol is to be displayed on the cathode ray tube. The A and B segment pulses are applied continuously from a free running multivibrator and the synchonized request pulses are applied only during desired READ intervals.

The A and B pulses are timed so that the A pulse occurs during the first half of a request pulse and the B pulse occurs during the second half of the request pulse. If preferred, several cycles of A and B pulses could be provided alternately during a single READ interval.

After a given symbol has been selected in the selection means, concurrence of an A pulse and a request pulse causes enabling pulses to be sent to associated electronic switches in the X switch bank and the Y switch bank. This permits A segment voltages to be applied to the horizontal and vertical deflection plates of a cathode ray tube.

When the B pulse occurs, enabling pulses are sent from the selection means to the associated B segment electronic switches and the voltage waveforms corresponding to the B segment of the selected symbol are passed to the horizontal and vertical deflection plates of the cathode ray tube.

A Z axis switching means 51 may be employed to intensity modulate the beam of the cathode ray tube. This switching means may be synchronized with the enabling pulses from the timing means so that the beam is blanked during actual switching so as to prevent switching transients from appearing on the cathode ray tube display. Beam modulation is also convenient for producing periods, colons, and similar symbols. The timing of the intensity modulation in none of these cases is critical, however, since it determines merely the duration of the display rather than the shape of the symbol.

It will be appreciated that although only relatively few electronic switches have been illustrated in each switch bank in order to simplify the explanation, a practical embodiment would contain numerous electronic switches since each segment to be displayed requires an electronic switch in each switch bank.

Means for displaying specific symbols have been indicated in FIG. 8 so as to simplify the explanation by way of example.

Assume that a numeral "1" is to be displayed. When a request pulse and an A pulse are supplied to the selection means, an enabling pulse will appear on the line 53. This will cause the electronic switches 55 and 57 to conduct so that the 1 (X) voltage can be passed through the X switch to the X output terminal and the 1 (Y) voltage can be passed through the Y switch bank to the Y output terminal. Since the numeral "1" happens to be a symbol in which one vertical segment can conveniently be used for the entire symbol, the selection means again provides an enabling pulse to the same lead 53 during the B pulse interval.

In the event that a numeral "2" is to be displayed, an enabling pulse is first passed through the lead 59 to the electronic switches 61 and 63. Voltages to form the semi-elliptical A segment of the desired symbol are supplied to the cathode ray tube during the A pulse interval. During the B pulse interval, voltages for forming the angulate segment are supplied to the cathode ray tube through the electronic switches 65 and 67.

The basic system illustrated can be expanded, if desired, so that the symbols can be divided into more than two segments. An "H," for instance, can be formed from three straight line segments, and a "B" can be formed from two semi-ellipses and a vertical line.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Apparatus for producing a desired symbol on a cathode ray tube during a READ interval comprising:

(1) a center-tapped source of sine waves, (2) first and second outside terminals on said source for providing oppositely-phased sine waves, (3) A and B segment generating networks for producing first and second segments of the desired symbol respectively, each of said segment generating networks being connected to receive the sine waves from said outside terminals, (4) displacement responsive means in each of said A and B segment generating networks arranged to pass only those portions of the sine waves exceeding thresholds predetermined for each of the symbol segments, (5) means in each of said A and B segment generating networks to establish a D.C. level for the output of that network, (6) selective switching means for coupling the entire output signal of each segment generating network directly to the deflection plates of the cathode ray tube, and (7) means to actuate the selective switching means so as to couple the outputs of the A and B segment generating networks alternately to the cathode ray tube.

2. The apparatus of claim 1 in which the desired symbol is a "U" and wherein the A segment generating network contains first and second rectifiers connected to pass positive-going half-wave pulses from said first and second outside terminals to horizontal and vertical deflection plates of a cathode ray tube respectively.

3. The apparatus of claim 1 in which the desired symbol is a "2" and wherein the A segment generating network includes a rectifier connected to pass full-wave rectified pulses to the horizontal deflection plates of a cathode ray tube and a 90° phase shifter to pass a phase shifted sine wave to the vertical deflection plates of the cathode ray tube.

4. The apparatus of claim 3 further characterized in that the B segment generating network contains first and second rectifiers connected to pass positive-going half-wave pulses from said first and second outside terminals to the horizontal and vertical deflection plates of a cathode ray tube respectively.

5. The apparatus of claim 1 in which the desired symbol is a "3" and wherein the A and B segment generating networks each contain a rectifier connected to pass full-wave rectified pulses to the horizontal deflection plates of a cathode ray tube, and a 90° phase shifter to pass a phase-shifted sine wave to the vertical deflection plates of a cathode ray tube.

6. The apparatus of claim 1 in which the desired symbol is a "4" and wherein the A segment generating network contains a rectifier to pass full-wave rectified pulses to the horizontal deflection plates of a cathode ray tube, and a half-wave rectifier to pass half-wave rectified pulses to the vertical deflection plates of a cathode ray tube.

7. The apparatus of claim 1 in which the desired symbol is a "6" and wherein the A segment generating network contains a full-wave rectifier to couple rectified sine waves to the horizontal deflection plates of a cathode ray tube and a 90° phase shifter to couple a phase-shifted sine wave to the vertical deflection plates of cathode ray tube, and wherein the B segment generating network contains means to couple a sine wave to the horizontal deflection plates of a cathode ray tube and 90° phase-shifting means to couple a phase-shifted sine wave to the vertical deflection plates of a cathode ray tube.

8. The apparatus of claim 1 in which the desired symbol is an "8" and wherein the A and B segment generating networks each contain means to couple a sine wave from said source to one set of deflection plates of a cathode ray tube, a 90° phase shifting means, and means to couple the phase-shifted sine wave to the other set of deflection plates of a cathode ray tube.

9. The apparatus of claim 1 in which the desired symbol is an "X" and wherein the A segment generating network includes means to couple sine waves from one outside terminal to both sets of deflection plates of a cathode ray tube and the B segment generating network includes means to couple sine waves from the first and second outside terminals to horizontal and vertical deflection plates of a cathode ray tube respectively.

10. Apparatus for producing the symbol "5" on a cathode ray tube comprising:

(1) a center tapped source of sine waves, said source having first and second outside terminals for providing oppositely-phased energizing voltages, (2) an A segment generating network for producing a 90° angulate segment, said network including:

(a) first and second half wave rectifiers connected to one outside terminal of said source, said first and second rectifiers being connected to conduct on opposite halves of a cycle, (b) a pair of network terminals for coupling the output of the first and second rectifiers to the horizontal and vertical deflection plates of a cathode ray tube respectively, (3) a B segment generating network for generating a semi-ellipse including:

(a) a full wave rectifier connected to receive energy from said sine wave source, (b) a 90° phase shifter connected to one outside terminal of the sine wave source, (c) a first network terminal for coupling the output of the full rectifier to the horizontal deflection plates of a cathode ray tube, (d) a second network terminal for coupling the output of the 90° phase shifter to the vertical deflection plates of a cathode ray tube, (4) switching means to connect the A segment generating network and the B segment generating network sequentially to the cathode ray tube.

11. Apparatus for producing a symbol "F" on a cathode ray tube comprising:

(1) a source of sine waves, (2) an A segment generating network for producing a 90° angulate segment, said network including:

(a) first and second half-wave rectifiers connected to one terminal on said source, said first and second rectifiers being connected to conduct on opposite halves of the cycle, (b) means to connect the output of the first and second rectifiers to the horizontal and vertical deflection plates of a cathode ray tube respectively, (c) direct current biasing means connected in the output circuit of each rectifier to position the A segment on the face of the cathode ray tube, (3) a B segment generating network for producing a horizontal segment, including:

(a) means to connect said source of sine waves to the horizontal deflection plates of a cathode ray tube, (b) direct current biasing means to position the B segment on the face of the cathode ray tube, and (4) switching means to couple the A segment generating network and the B segment generating network sequentially to the cathode ray tube.

12. Apparatus for producing the symbol "H" on a cathode ray tube comprising:

(1) a center tapped source of sine waves, said source having first and second outside terminals for providing oppositely-phased energizing voltages, (2) an A segment generating network for producing branched line segments, said network including:

(a) threshold means connected to one of said outside terminals, said threshold means being biased to pass only voltages exceeding a predetermined instantaneous positive threshold value, (b) a 90° phase shifter connected to the second of said outside terminals, (c) a bi-polar threshold means connected to the output of the phase shifter, said bi-polar threshold means being biased to pass only voltages of either polarity exceeding predetermined instantaneous threshold values, (d) blocking capacitors in the output of each threshold means, to pass only the A.C. component of the respective waves, (e) a first network terminal for coupling the output of the threshold circuit to the horizontal deflection plates of a cathode ray tube, (f) a second network terminal for coupling the bi-polar threshold circuit to the vertical deflection plates of a cathode ray tube, (3) a B segment generating network for applying a sine wave to the vertical deflection plates of a cathode ray tube, (4) switching means for coupling the A segment generating network and the B segment generating network sequentially to the cathode ray tube.

13. The apparatus of claim 12 in which the various threshold means are biased to conduct only during a 90° conduction period.

References Cited by the Examiner

UNITED STATES PATENTS

| | | | |
|---|---|---|---|
| 2,766,444 | 10/1956 | Sheftelman | 340—318 |
| 3,047,851 | 7/1962 | Palmiter | 340—324.1 |

NEIL C. READ, *Primary Examiner.*

A. J. KASPER, *Assistant Examiner.*